United States Patent [19]

Miki

[11] Patent Number: 4,715,170

[45] Date of Patent: Dec. 29, 1987

[54] APPARATUS FOR SELECTIVELY REMOVING TOBACCO PLANT LEAVES

[75] Inventor: Hajime Miki, Oyama, Japan

[73] Assignee: Japan Tobacco Inc., Tokyo, Japan

[21] Appl. No.: 839,267

[22] Filed: Mar. 13, 1986

[30] Foreign Application Priority Data

Mar. 18, 1985 [JP] Japan .................................. 60-52344

[51] Int. Cl.⁴ ............................................ A01D 45/16
[52] U.S. Cl. ..................................................... 56/27.5
[58] Field of Search ........................ 56/27.5; 130/31 R

[56] References Cited

U.S. PATENT DOCUMENTS

| | | | |
|---|---|---|---|
| 3,550,365 | 12/1970 | Lovett et al. | 56/27.5 |
| 3,654,753 | 4/1972 | Gervais | 56/27.5 |
| 3,744,224 | 7/1973 | Chapman | 56/27.5 |
| 3,772,862 | 11/1973 | Wilson | 56/27.5 |
| 4,035,998 | 7/1977 | Griner et al. | 56/27.5 |
| 4,391,084 | 7/1983 | Wilson | 56/27.5 |

FOREIGN PATENT DOCUMENTS

| | | | |
|---|---|---|---|
| 667182 | 6/1979 | U.S.S.R. | |
| 738541 | 6/1980 | U.S.S.R. | |
| 1130231 | 12/1984 | U.S.S.R. | 56/27.5 |

OTHER PUBLICATIONS

Abstract Disclosure of U.S.S.R. Patent No. 667-182 6-15-79.
Abstract Disclosure of U.S.S.R. Patent No. 738-541 06-5-80.

Primary Examiner—Stephen J. Novosad
Assistant Examiner—William P. Neuder
Attorney, Agent, or Firm—Schwartz, Jeffery, Schwaab, Mack, Blumenthal & Evans

[57] ABSTRACT

An apparatus for plucking tobacco leaves has a pair of supporting members. These members are positioned on either side of a row of tobacco plants and extend parallel to this row and can move along the row. Two front arms are pivotally connected at the upper end to the supporting members. Two rear arms are pivotally connected at the upper end to the supporting members. A leaf-plucking arm is pivotally connected at both ends to the lower ends of the front and rear arms connected to one of said supporting members, whereby the leaf-plucking arm, the front and rear arms and the supporting member form a parallel linkage. Another leaf-plucking arm is pivotally connected at both ends to the lower ends of the front and rear arms connected to the other support member, whereby this leaf-plucking arm, the front and rear arms and the supporting member form another parallel linkage. The leaf-plucking arms extend parallel to each other and are spaced apart, forming a gap wide enough to allow the passage of a tobacco stalk and to provide a gap between the stalk and either leaf-plucking arm. Further, wheels are rotatably attached to each of said leaf-plucking arms and arranged at regular intervals in the lengthwise direction of the leaf-plucking arm. Each wheel has spokes extending into the gap between said leaf-plucking arms. A crank mechanism is provided to move the rear arms back and forth.

10 Claims, 11 Drawing Figures

APPARATUS FOR SELECTIVELY REMOVING TOBACCO PLANT LEAVES

BACKGROUND OF THE INVENTION

The present invention relates to an apparatus for plucking leaves from the stalk of a tobacco plant to harvest the same.

Tobacco leaves sprout from the entire stalk, from the base to the top. They sequentially ripen, from bottom to top. Hence, the lower leaves must be harvested before leaves at the top of the stalk. It is important to pluck ripe leaves and not damage unripe leaves nor the stalk. Since leaves grow in all directions on the stalk, it is extremely difficult to mechanically pluck only ripe leaves.

U.S. Pat. Nos. 3,083,517 and 3,841,071 disclose apparatuses for plucking tobacco leaves from stalks. Both of the apparatuses feature two leaf-plucking rods. In use, the rods are positioned, which clamps a tobacco stalk, then rotated and lowered, thereby plucking the leaves from the stalk. However, the apparatus disclosed in either U.S. Patent has the following drawbacks. Although relatively simple in structure, they both tend to severely damage the leaves. Another drawback is that the rods sometimes fail to pluck leaves that are parallel to the rods.

Another apparatus is disclosed in Japanese Patent Publication Sho. No. 54-30930. This apparatus has leaf-plucking rods spaced apart from each other and at regular intervals in the horizontal direction. Each of these has one flexible end. The flexible end swirls as the rod is rotated to pluck the leaves of a tobacco plant. Since the rods have a movement similar to that of a person's hands in manual plucking, this apparatus damages leaves less. The apparatus does, however, have the following disadvantages. The swirling flexible end of each rod sometimes hits the leaf portion instead of the stem near the stalk, which severely damages the leaf. The rods also may fail to pluck leaves extending parallel to the rods.

SUMMARY OF THE INVENTION

It is an object of the present invention to provide an apparatus for plucking tobacco leaves from a stalk, without damaging them no matter what direction the leaves sprout from the stalk.

According to the present invention, there is provided an apparatus comprising:

means being movable along one row of tobacco plants and having a pair of supporting members which can be positioned on either side of the row of tobacco plants and extend parallel to the row of tobacco plants;

a pair of first arms pivotally connected at the upper end to the supporting members;

a pair of second arms pivotally connected at the upper end to the supporting members and spaced apart from said first arms by a predetermined distance along the row of tobacco plants;

a pair of leaf-plucking arms, one being pivotally connected at both ends to the lower ends of the first and second arms which are connected to one of said supporting members, and the other being pivotally connected at both ends to the lower ends of the first and second arms which are connected to the other support member, said leaf-plucking arms extending parallel to each other and spaced apart, forming a gap wide enough to allow the passage of a tobacco stalk and to provide a gap between the stalk and either leaf-plucking arm;

a plurality of wheels rotatably attached to each of said leaf-plucking arms and arranged at regular intervals in the lengthwise direction of the leaf-plucking arm, each wheel having a pllurality of spokes long enough to extend into the gap between said leaf-plucking arms; and drive means for moving said first pair and said second pair of arms back and forth, to thereby move said leaf-plucking arms up and down.

The apparatus of the invention can pluck tobacco leaves from the stalk as the leaf-plucking arms are moved down, with the stalk positioned between these arms. More specifically, as leaf-plucking arms are lowered, the tobacco leaves are plucked. Leaves sprouting parallel to the leaf-plucking arms from the stalk cannot be plucked by the leaf-plucking arms, but are plucked by the wheels whose spokes extend into the gap between the leaf-plucking arms. Hence the apparatus can pluck tobacco leaves sprouting from the stalk in any direction.

Further, the leaf-plucking arms and the wheels attached to these arms are so arranged that they hit only the stems of tobacco leaves. Therefore, the apparatus of the invention can pluck tobacco leaves without damaging them.

Moreover, the leaf-plucking arms can be set at any desired height and, hence, can pluck only tobacco leaves below them. It follows that the apparatus of the invention can selectively pluck only fully ripe leaves from the stalk.

DETAILED DESCRIPTION OF THE PREFERRED EMBODIMENTS

Figure 1:
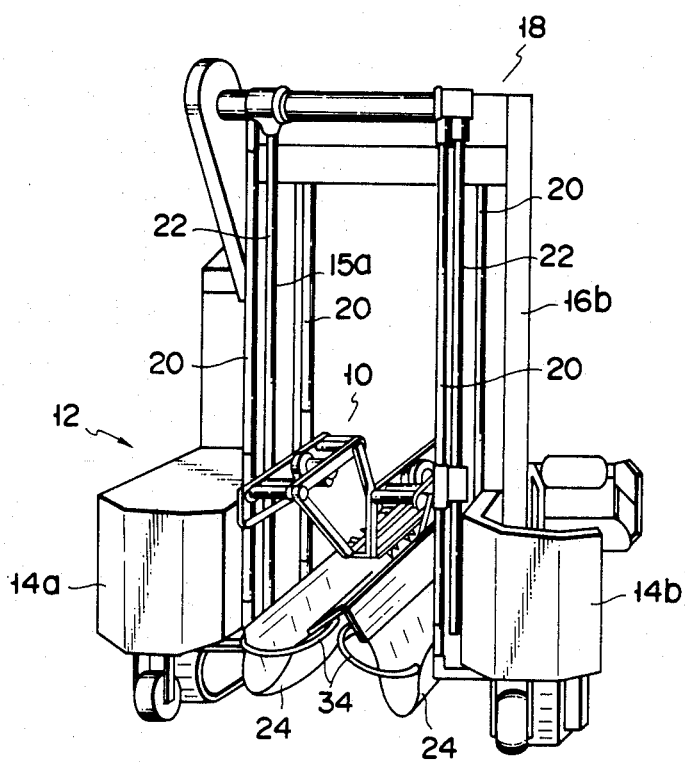
FIG. 1 is a perspective of a tobacco leaf harvesting machine having a leaf removing apparatus according to one embodiment of the present invention.
Figure 2:
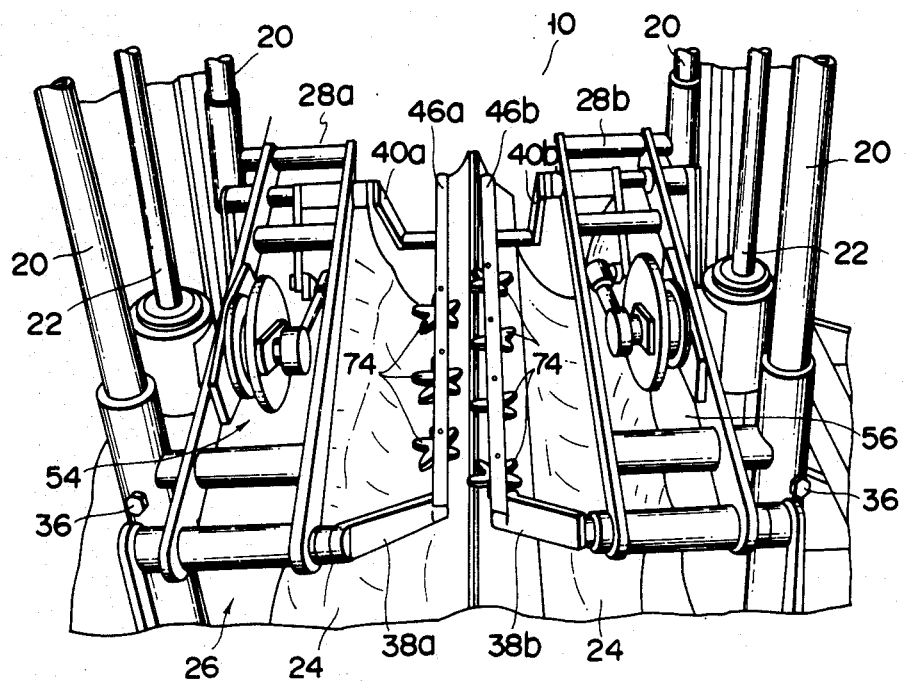
FIG. 2 is a perspective view of a leaf removing apparatus of the harvesting machine.

FIG. 1 shows a vehicle 12 mounted with a leaf removing apparatus 10 according to one embodiment of the present invention. The vehicle 12 can move over a row of tobacco plants. The vehicle 12 has a pair of trucks 14a and 14b or crawler or wheel type movable on the portion between ridges in a field. In this embodiment, the trucks 14a and 14b are of a crawler type. The trucks 14a and 14b have posts 16a and 16b stood thereon. The upper ends of the posts 16a and 16b are coupled by a horizontal section 18. The height of the horizontal section 18 is set so that the vehicle 12 can move sufficiently over tobacco plants cultivated at the ridge in a field.

The trucks 14a and 14b have a pair of poles 20 extending in parallel along the posts 16a and 16b, and drive shafts 22 extending in parallel between the poles 20. A number of positioning threaded openings (not shown) are formed at a predetermined interval at the poles 20 along the longitudinal direction and used to regulate the height of the leaf removing apparatus 10 to be described in detail. The drive shafts 22 are synchronously rotated by a drive source such as an engine or a motor of the vehicle 12. In addition, the drive source is carried on one truck such as the truck 14a to drive the crawler of the truck 14a and the shaft 22. The drive force of the drive source is transmitted through a transmission mechanism which is arranged in the post 16a, the horizontal section 18 and the post 16b to the other truck 14b to thereby drive the crawler and the drive shaft 22 of the truck 14b in the same manner as the truck 14a side.

A pair of containing bags 24 for receiving the plucked leaves are provided under leaf removing apparatus 10 between the trucks 14a and 14b. The bags 24 extend in the moving direction of the vehicle 12, and the bags 24 are spaced at a predetermined interval, i.e., an interval of the degree for sufficiently passing the stalk of the tobacco plant.

The leaf removing apparatus 10 will be described in detail. The apparatus 10 has, as shown best in FIG. 3, a frame 26 disposed between the trucks 14a and 14b above the bags 24. The frame 26 comprises a pair of supporting members 28a and 28b. The supporting members 28a and 28b extend in parallel with the moving direction of the vehicle 12 designated by an arrow in FIG. 3, and spaced at a predetermined interval therebetween. The members 28a and 28b include long plates 30 extending in parallel and pins 32 for coupling the both ends of the plates 30.

One supporting member 28a is movably mounted on the poles 20 of the truck 14a through a pair of slide bearings 34. The other supporting member 28b is also movably mounted on the poles 20 of the truck 14b through a pair of slide bearings 34 in the same manner as the arm supporting member 28a. Bolts 36 are provided as fastening means for fastening the supporting members 28a and 28b in an arbitrary height on the poles 20, respectively. In particular, the supporting members 28a and 28b can be fastened in the arbitrary height by screwing the bolt 36 of each slide bearing 34 into one of the threaded openings of the corresponding pole 20.

A pair of first arms 38a and 38b and a pair of second arms 40a and 40b are disposed between the supporting members 28a and 28b. The first and second arms are spaced apart by a predetermined distance in the longitudinal direction of the supporting members. The upper ends of the arms 38a and 38b are pivotally connected to first pins 42a and 42b projected oppositely to one another from the members 28a and 28b, respectively. The upper ends of arms 40a and 40b are mounted on second pins 44a and 44b projected from the members 28a and 28b, respectively. As apparent from FIG. 3, the pins 42a and 42b extend from the members ∞a and 28b, respectively, and are closer to each other than the pins 44a and 44b to thereby provide the interval between the arms 38a and 38b shorter than that between the arms 40a and 40b. The lengths of the arms 38a, 38b, 40a, 40b are substantially the same.

The lower ends of the first and second arms 38a and 40a are pivotally connected to a leaf-plucking arm 46 a through pins 48a and 50a, and the lower ends of the fisrt and second arms 38b and 40b are pivotally connected to a leaf-plucking arm 46b through pins 48b and 50b. As apparent from FIG. 3, spacer 52 are respectively mounted on the pins 50a, 50b to thereby hold the leaf-plucking arms 46a and 46b in parallel with one another.

The distance between the pins 48a and 50a is equal to that between the pins 48b and 50b, and equal to the distance between the pins 42a and 44a (or between the pins 42b and 44b). Therefore, the arms 38a, 38b, 40a, 40b and the arms 46a and 46b form a pair of parallel linkages.

The distance l between the arms 46a and 46b (FIG. 5) is preferably approx. 1.5 to 4 times of the diameter of a stalk A in a tobacco plant, because if the distance l is shorter than 1.5 times of the diameter of the stalk A, the leaf-plucking arms 46a and 46b make contact with the stalk A to possibly damage the stalk A, while if the distance l is longer than 4 times of the diameter of the stalk A, the leaf-plucking arms 46a and 46b do not contact the stem of the tobacco leaf to tend to incompletely pluck the tobacco leaf.

Figure 3:
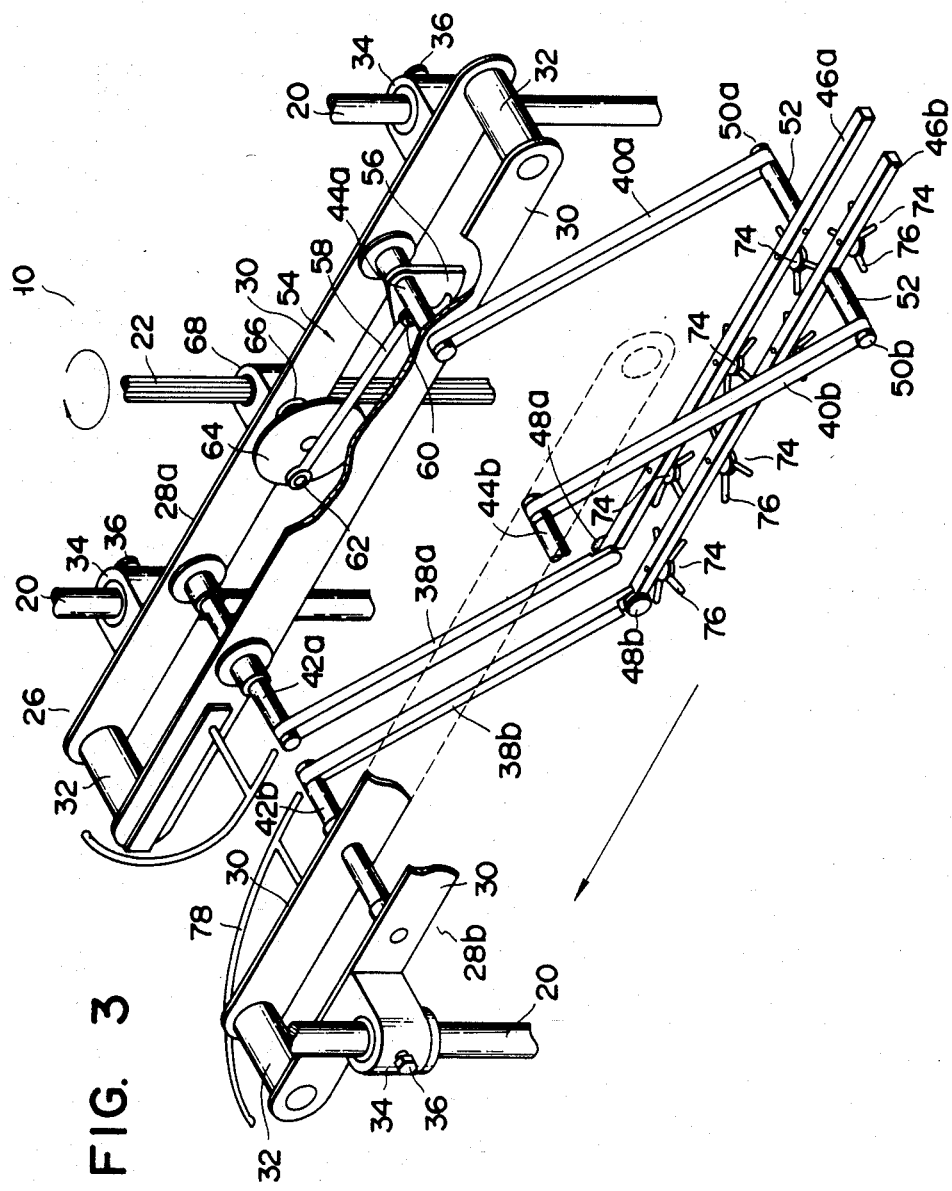
FIG. 3 is a perspective view of the leaf removing apparatus partly cut out.

The pins 44a and 44b are reciprocally rotated in a predetermined angular range by cranking mechanisms 54 (only one of which is described in FIG. 3). The cranking mechanism 54 is disposed between the plates 30 of supporting member 28a and has a sector plate 56 mounted on the pin 44a. One end of a rod 58 is pivotally connected to the sector plate through a crank pin 60. The other end of the rod 58 is pivotally connected to a rotary disc 64 through a crank pin 62, and the disc 64 is disposed between the plates 30 and mounted on a shaft 66 which is rotatably supported on the outer plate 30 of the member 28a. The shaft 66 of the disk 64 is connected to a gear box 68 mounted on the outer plates 30. The drive shaft 22 of the truck 14a is inserted through the gear box 68, the rotational force of the shaft 22 is transmitted through a worm gear or a bevel bear disposed in the gear box 68 to the shaft 66, thereby rotating the shaft 66 and hence the disc 64. In addition, as apparent from FIG. 3, the drive shaft 22 is formed as a spline shaft. Thus, the mesh of gears in the gear box 68 remain, even if the gear box 68 or the supporting member 28a is moved along the spline shaft. In other words, even if the gear box 68, i.e., the member 28a is disposed in any axial position of the spline shaft 22, the rotation of the spline shaft 22 can be transmitted to the disk 64.

Figure 4:
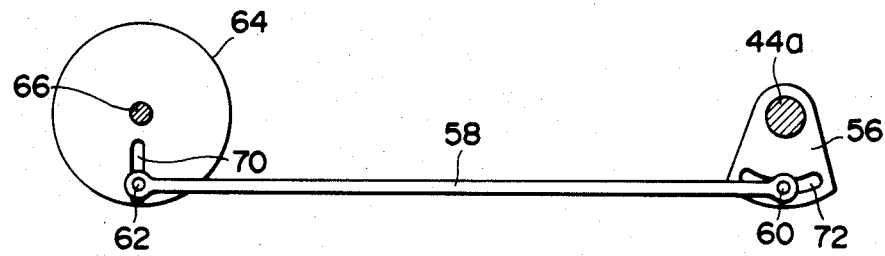
FIG. 4 is a side view showing part of a crank mechanism.

As shown in FIG. 4, the crank pin 62 is arranged into a radial slit 70 formed in the disk 64. Therefore, the mounting position of the pin 62 with respect to the disk 64, i.e., the cranking radius of the crank disk 64 is adjustable. When adjusting the cranking radius, the moving angle of the crank plate 56, i.e., the lifting angles of the arms 38a and 40a can be adjusted. In other words, the vertical strokes of the arms 46a can be adjusted together with the arms 38a and 40a.

On the other hand, the mounting position of the crank pin 60 with respect to the crank plate 56 can be also adjustable. As shown in FIG. 4, a slit 72 which extends along the periphery of the plate 56 is formed in the plate 56, and the pin 60 is arranged within the slit 72. Thus, the mounting position of the pin 60 with respect to the plate 56 can be adjustable in the circumferential direction of the plate 56.

When the mounting position of the crank pin 60 is adjusted in the circumferential direction of the plate 56, the range of the stroke of the arm 46a in the vertical direction can be displaced in the same direction. If the length of the rod 58 is altered instead of adjusting the mounting position of the pin 60, the range of the stroke of the arm 46a may be displaced in the vertical directions.

The same cranking mechanism as the above-mentioned cranking mechanism 56 is disposed in the other supporting member 28b, and the arms 38b and 40b are lifted in cooperation with the arms 38a and 50a by the cranking mechanism. In other words, a pair of leaf-plucking arms 46a and 46b are cooperatively reciprocated in the vertical direction while maintaining the parallel state.

A plurality of wheels 74 are rotatably mounted on the lower surfaces of the arms 46a and 46b. The wheels are, as apparent from FIG. 5, disposed alternately in the longitudinal direction of the arms 46a and 46b in a so-called zigzag state. A plurality of spokes 76 are projected from the periphery of the wheels 74. The spokes 76 have a length enough to extend to the gap between the arms 46a and 46b. More particularly, the wheels 74 have a radius which does not disturb the rotations thereof without interfering the adjacent wheels 74, and the rotating areas of the spokes 76 of the wheels 74 are overlapped in the gap between the arms 46a and 46b.

A pair of guide wires 78 extending in a horizontal direction are disposed at the front portion of the frame 26 as seen from the moving direction of the vehicle 12. The wires 78 are respectively mounted on the members 28a and 28b, and bent at the front ends to open toward the outside. Thus, the wires 78 operate to smoothly guide the stalk A of the tobacco plant between the arms 38a and 38b as the vehicle 12 runs.

The operation of the leaf removing apparatus 10 thus constructed and described above will be described. The vehicle 12 provided with the leaf removing apparatus 10 bridges over tobacco plants cultivated at the ridge, and runs so as to guide the stalks of tobacco plants between the wires 78 and hence between the leaf-plucking arms 46a and 46b. The running speed of the vehicle 12 is, for example, 0.4 to pb 2.7 km/hr.

The drive shaft 22 of each cranking mechanism is rotated as the vehicle 12 runs, and the discs 64 are rotated through the gear boxes 68. Thus, the rods 58 are pushed and pulled, and the second arms 40a and 40b move in an angular range through the pins 44a, 44b and the crank plates 56. The operating speeds of the arms 40a and 40b are, for example, two to three times of reciprocations for one second. When the arms 40a and 40b are moved, the arms 38a and 38b are cooperatively moved through the arms 46a and 46b, and the arms 46a and 46b are resultantly reciprocated in the vertical direction. Here, the stroke range of the leaf-plucking arms 46a and 46b are adjusted so that its upper limit of the stroke range coincide with the level of the guide wires 78 by regulating the mounting position of the crank pin 60.

Figure 6:
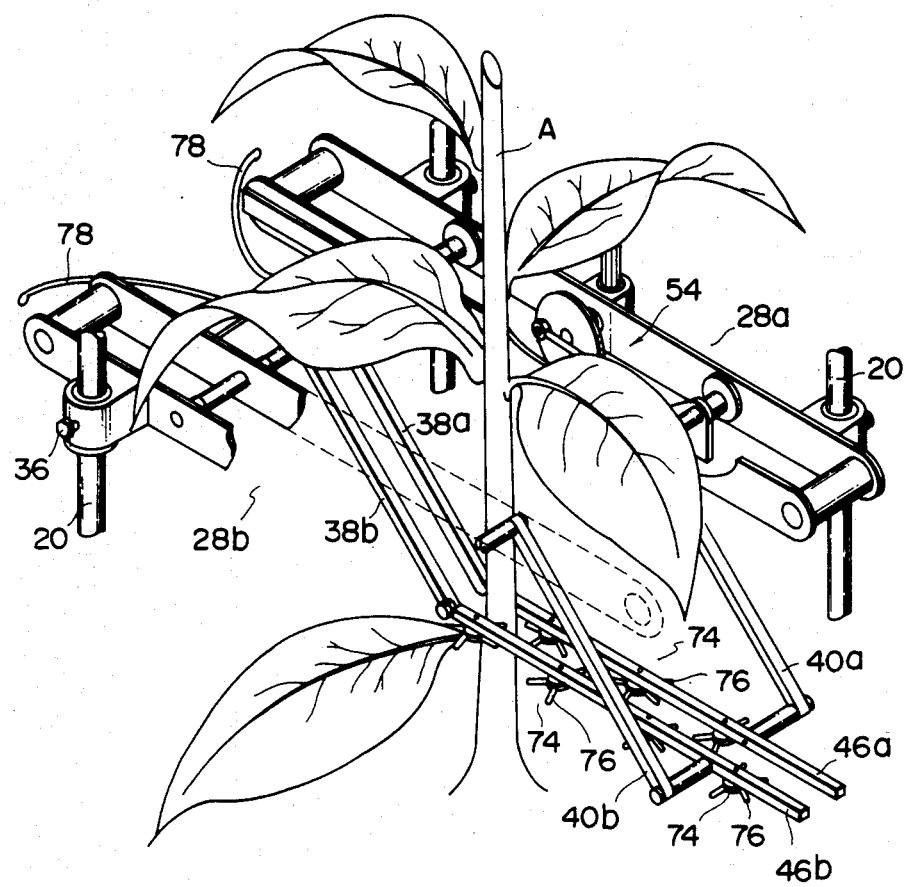
FIG. 6 is a perspective view showing the apparatus in use.

As shown in FIG. 6, the stalk A of the tobacco plant passed between the wires 78 is guided between the arms 38a and 38b. When the arms 38a and 38b are lifted to the upper limit at this time, the tobacco leaves of the stalk A disposed at the lower side of the wire 78 are always positioned at the lower sides of the arms 38a and 38b or at the lower sides of the arms 46a and 46b as the vehicle moves forward. Therefore, when the leaf-pluckings arms 46a and 46b are moved downward, the tobacco leaves are removed by the arms 46a and 46b.

Figure 5:
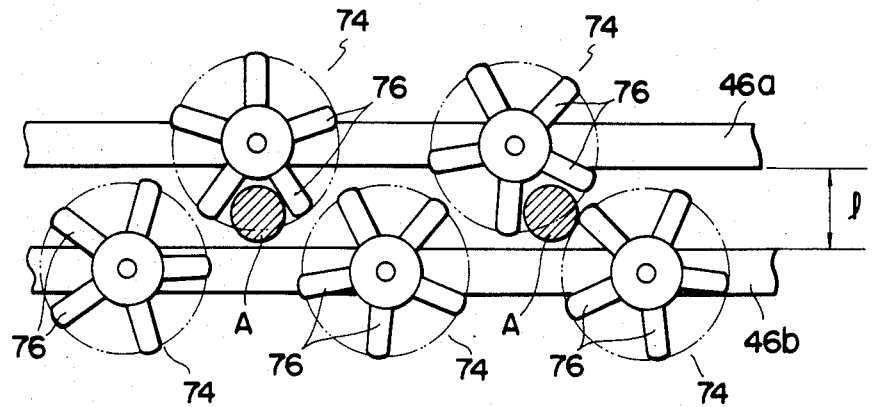
FIG. 5 is a bottom view showing part of the leaf-plucking arms and wheels.

The leaf removing action of the apparatus will be described further in detail. The leaves extending from the stalk A in the direction for crossing the leaf-plucking arms 46a and are plucked from the stems of the leaves near to the stalk A by the arms 46a and 46b when the arms 46a and 46b move downward. The plucked tobacco leaves are dropped to the bags 24. On the other hand, the tobacco leaves extending from the stalk A in the direction parallel with the leaf-plucking arms 46a and 46b are contacted with the spokes 76 of the wheels 74 at the stem of the leaves so that the tobacco leaves are removed from the stalk A and dropped into the bags 24. As shown in FIG. 5, even if the stalk A of the tobacco plant is disposed at any position in side the longitudinal directions of the arms 46a and 46b, the arms 46a and 46b or the spokes 76 of the wheels 74 are accessed to remove the tobacco leaves from the stalk A of the tobacco plant. Thus, the leaves growed on the outer periphery of the stalk A of the plant can be completely harvested.

More particularly, the tobacco leaves disposed in the stroke range of the leaf-plucking arms 46a and 46b or at the lower side from the wires 78 can be accurately removed as described above.

When the height position of the frame 26 is adjusted, the leaf removing area of the tobacco leaves can be altered.

According to the leaf removing apparatus 10 of the present invention, the relatively thick roots of the stem of the tobacco leaf can be pressed down by the leaf-plucking arms 46a and 46b or the spokes 76 of the wheels 74 in the leaf removing operation. Therefore, the shearing force can be effectively acted on the stem of the tobacco leaf to efficiently remove the tobacco leaves from the stalk A. Thus, the tobacco leaves are not damaged, and the tobacco leaves of high quality can be obtained in the same manner as the manual harvesting.

In addition, the wheels 74 can be freely rotated, and the wheels 74 do not disturb the stalks A passing between the leaf-plucking arms 46a and 46b, nor damage the same.

Only the tobacco leaves in the strode range of leaf-plucking arms 46a and 46b can be accurately harvested by the arms 46a and 46b, and the tobacco leaves not sufficiently ripened are not mixed in the harvested leaves. The arm assembly for removing the tobacco leaves in the leaf removing apparatus 10 are simply constructed in the mechanism, and high reliability can be provided in the plucking operation, and the tobacco leaves removed from the stalk and the tobacco leaves of the near tobacco plant cultivated at the adjacent ridge are not wound around the arms.

In the leaf removing apparatus 10 described above, the leaf removing strokes of the arms 46a and 46b can be readily and steplessly adjusted by altering the mounting position of the crank pin 62 of the rotary disk 64. Further, the leaf removing strokes of the arms 46a and 46b can be displaced in the vertical direction as it is by altering the mounting position of the crank pin 60 on the crank plate 56. Thus, the upper limit positions of the leaf removing stroke of the arms 46a and 46b can be coincided with the height of the wires 78, with the result that the leaves not removed at this time can be prevented from being damaged by the wires 78.

Figure 7:
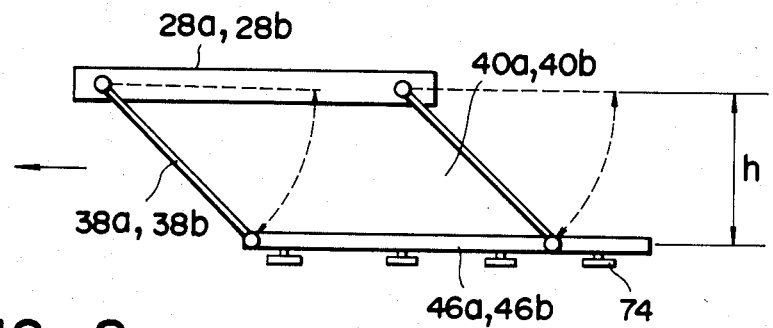
FIGS. 7 to 11 are schematic side views showing simplified apparatus of different types of the present invention.

As apparent from the foregoing description, the leaf removing apparatus 10 of the embodiment of the present invention can remove the leaves of the tobacco plant when the leaf-plucking arms 46a and 46b mainly move downward. In other words, as shown in simplified manner in FIG. 7, while the vehicle 12 moves in the direction of an arrow, the leaves disposed in the stroke range of the height h are all guided by the arms 38a and 38b to the arms 46a and 46b, and harvested by the arms 46a and 46b and the spokes 76 of the wheels 74. In other words, the arms 38a and 38b operate also as leaf guiding arms.

Figure 8:
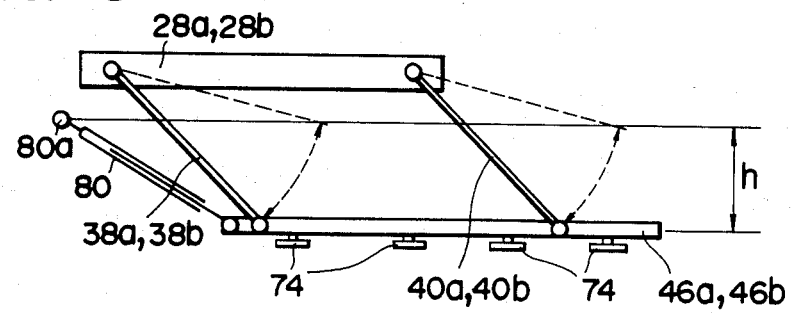

The present invention is not limited to the embodiment of the leaf removing apparatus 10 described above. Various other changes and modifications may be made within the spirit and scope of the present invention. For example, in the modified embodiment shown in FIG. 8, a pair of arms 80 exclusively guiding the leaves of the tobacco plant (one of which is shown) may be provided at the front side of the first arms 38a and 38b separately from the arms 38a and 38b. In this case, the interval between the arms 38a and 38b may be widened as compared with the case of FIG. 3. The upside fulcrums 80a of the arms 80 are disposed on the frame 26, and the height can be adjustable. The fulcrums 80a are set to the upper limit of the leaf removing strokes of the arms 46a and 46b. Since the fulcrums 80a are positioned at different levels from the top ends of the arms 38a and 38b and hence the pins 42a and 42b, the leaf guiding arms 80 are necessarily telescoped as the arms 46a and 46b moves in the vertical direction. Thus, the arms 80, for example, comprises a cylinder and a rod slidably inserted into the cylinder.

Figure 9:
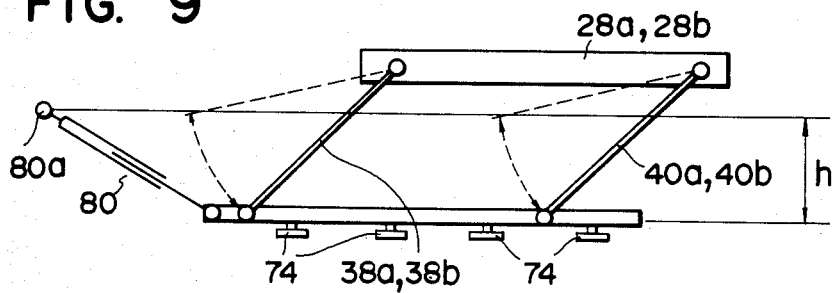

In the case of another modified embodiment shown in FIG. 9, the inclining directions of the arms 38a, 38b and 40a, 40b are reverse to those of the above embodiment. In this case, the leaf guiding arms 80 use the same telescopic arm as that of the embodiment in FIG. 8. This embodiment can be applied to the case that the structure shown in FIG. 8 cannot be employed according to the construction of the vehicle.

Figure 10:
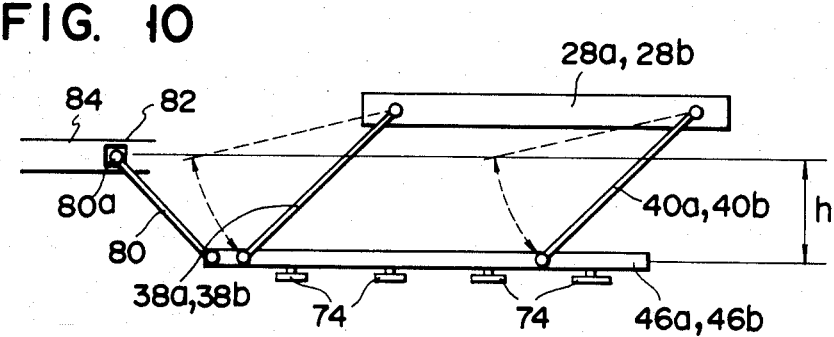

Still another modified embodiment in FIG. 10 has substantially the same structure as that of the embodiment in FIG. 9, except that the leaf guiding arms 80 are not telescopic. In other words, sliders 82 are mounted to the fulcrums 80a of the leaf guiding arms 80 in FIG. 10, and the sliders 82 are slidably engaged with guide slots 84 extending in the moving direction of the vehicle 12.

In the four embodiments shown in FIGS. 7 to 10 described above, the leaf-plucking arms 46a and 46b are all moved downward to remove the tobacco leaves. In still another modified embodiment in FIG. 11, the leaf-plucking arms 46a and 46b mainly move upward to remove the tobacco leaves. In this case, rotary wheels 74 are mounted on the upper surfaces of the arms 46a and 46b, and the fulcrums 80a of the leaf guiding arms 80 are set to the lower limit position of the leaf removing stroke.

Figure 11:
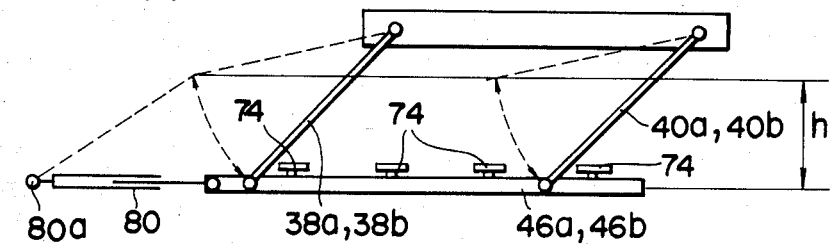

According to the structure of FIG. 11 which removes the tobacco leaves when the arms 46a and 46b move upward, tobacco leaves growed on the root of the stalk A of the tobacco plant can be preferably harvested. This embodiment can be applied to the case that the leaf removing apparatus 10 cannot be mounted at the high level position according to the construction of the vehicle for carrying the apparatus 10.

The inclining directions of the arms 38a, 38b and 40a and 40b and the construction of the leaf removing arms 80, and the mounting position of the rotary wheels 74 shown in the embodiments described above can be suitably combined and executed.

What is claimed is:

1. An apparatus for plucking tobacco leaves, comprising:
    means movable along one row of tobacco plants extending in a predeterminded direction said means having a pair of supporting members which can be positioned on both sides of the row of tobacco plants and extend parallel to the row of tobacco plants;
    a pair of first arms pivotally connected at the upper end to the supporting members;
    a pair of second arms pivotally connected at the upper end to the supporting members and spaced apart from said first arms by a predetermined distance in the directiion of said row of tobacco plants;
    a pair of leaf-plucking arms, one being pivotally connected at both ends to the lower ends of the first and second arms which are connected to one of said supporting members, and the other being pivotally connected at both ends to the lower ends of the first and second arms which are connected to the other support member, said leaf-plucking arms extending parallel to each other and spaced apart, forming a gap wide enough to allow the passage of a tobacco stalk and to provide a gap between the stalk and either leaf-plucking arm;
    a plurality of wheels rotatably attached to each of said leaf-plucking arms and arranged at regular intervals in the lengthwise direction of the leaf-plucking arm, each wheel having a plurality of spokes long enough to extend into the gap between said leaf-plucking arms; and
    drive means for moving said first pair and said second pair of arms back and forth, to thereby move said leaf-plucking arms up and down.

2. The apparatus according to claim 1, wherein said drive means further has means for adjusting the height of either pair of arms.

3. The apparatus according to claim 1, wherein said height-adjusting means comprises a plurality of poles connected to said supporting members for guiding said arms upward and downward, and a plurality of holding members for holding said supporting members at desired heights on the poles.

4. The apparatus according to claim 1, wherein one of the first arms, one of the second arms and one of the leaf-plucking arms form a first parallel linkage, and the other first arm, the other second arm and the other leaf-plucking arm form a second parallel linkage.

5. The apparatus according to claim 4, wherein said drive means comprises a pair of shafts connected to the upper ends of said pair of second arms and rotatably supported by said supporting members, a pair of crank plates attached to the shafts, a pair of discs attached to said supporting members, positioned at a predetermined distance from the crank plates and synchronously rotatable, and a pair of rods pivotally connected at one end to the crank plates and at the other end to the discs.

6. The apparatus according to claim 5, wherein said drive means further comprises a first positioning means for moving the position of those ends of said rods which are connected to said discs, in the radial direction of the discs.

7. The apparatus according to claim 6, wherein said first positioning means has a slot extending in the radial direction of said discs and includes a first crank pin pivotally connected to the other ends of said rods, inserted in the slot and adapted to be movable to any position within the slot.

8. The apparatus according to claim 6, wherein said drive means further comprises a second positioning means for moving the position of those ends of said rods which are connected to said crank plates, around said crank plates.

9. The apparatus according to claim 8, wherein said second positioning means has a slot extending in the circumferential direction of said discs and includes a second crank pin pivotally connected to the other ends of said rods, inserted in the slot and adapted to be movable to any position within the slot.

10. The apparatus according to claim 1, wherein the wheels attached to one of said leaf-plucking arms are staggered with respect to the wheels attached to other leaf-plucking arm.

* * * * *